United States Patent [19]

Rule

[11] 4,419,378
[45] Dec. 6, 1983

[54] CREAM/ALCOHOL-CONTAINING BEVERAGES

[75] Inventor: Charles E. Rule, Lakewood, Ohio

[73] Assignee: SCM Corporation, New York, N.Y.

[21] Appl. No.: 320,397

[22] Filed: Nov. 12, 1981

[51] Int. Cl.$^3$ ............................................. C12G 3/06
[52] U.S. Cl. ............................ 426/592; 426/330.2; 426/330.3; 426/330.4; 426/584
[58] Field of Search .................. 426/592, 330.4, 330.2, 426/330.3, 584, 580

[56] References Cited

U.S. PATENT DOCUMENTS

| | | | |
|---|---|---|---|
| 2,622,984 | 12/1952 | Peebles et al. | 426/586 |
| 3,486,906 | 12/1969 | Todd, Jr. | 99/50.5 |
| 3,753,724 | 8/1973 | Silby | 426/592 |
| 4,093,750 | 6/1978 | Babayan | 426/250 |
| 4,331,689 | 5/1982 | Shemwell | 426/592 |

FOREIGN PATENT DOCUMENTS

| | | | |
|---|---|---|---|
| 751900 | 7/1956 | United Kingdom | 426/592 |

OTHER PUBLICATIONS

Handbook of Food Additives, 2nd Ed., Furia, vol. I, 1972, CRC Press.
Emulsions & Emulsion Technology, Part I, Lissant, Dekker Publ., 1974.
Chemicals Used in Food Processing, Publ. #1274, Natl. Academy of Sciences, 1965.
Food Product Development, McCormick, vol. 8, No. 6, 1974, Jul., Aug., pp. 31, 32.
Emulsions: Theory & Practice, 2nd Ed., Becher, Reinhold Publ. Co., 1965.

*Primary Examiner*—Steven L. Weinstein
*Attorney, Agent, or Firm*—Richard H. Thomas

[57] ABSTRACT

An homogenized cream/alcohol-containing beverage comprising cream or milk and alcohol in drink preparation amounts, and a high HLB emulsifier selected from the group consisting of high HLB polyglycerol esters of fatty acids, ethoxylated fatty acid esters; and sugar esters, each in an emulsifying amount.

6 Claims, No Drawings

CREAM/ALCOHOL-CONTAINING BEVERAGES

The present invention relates to stable alcohol-containing, cream-based beverages. For purposes of the present application, the term "cream-based" includes a variety of dairy products broadly, including low-fat milk, milk, cream, half-and-half, and heavy cream. Broadly, any composition having more than 2% butterfat plus milk solids is within the scope of the term "cream-based", for purposes of the present application, although the present invention is particularly useful with heavy cream-based beverages which also contain alcohol. Heavy cream has about 40% butterfat.

Also for purposes of the present application, the term "stable" refers to emulsion stability against breaking of the emulsion. Products prepared according to the present invention have an emulsion shelf stability for up to eighteen months or longer under normal storage conditions (room temperature storage).

BACKGROUND OF THE PRESENT INVENTION

It is well known to prepare alcoholic drinks using an alcoholic beverage or liqueur and adding milk or cream to it. Typical such drinks are milk punch, an Alexander, Pink Squirrel, Golden Cadillac, Irish Alexander, Amareto Cream, and Grasshopper.

These drinks are usually prepared at home or at a bar for immediate consumption. Thorough mixing is accomplished by shaking the drink in a shaker, but if the drink is allowed to stand for a period of time, for instance one half hour, separation is likely to occur, developing separate fat and water phases, rendering the drink impalatable.

Cream or milk-based, alcohol-containing drinks are becoming more popular, cream or milk by many being considered a restorer of good health. It would be convenient for consumers of such drinks to be able to purchase them in a premixed, packaged, stable emulsion form. Because of the presence of the alcohol and a large amount of sugar, even refrigeration may not be necessary to prevent spoilage. The availability of premixed, purchasable cream-based drinks is particularly desirable where such drinks have to be made in relatively large quantities, for instance at parties. Also, many of such cream-based alcohol-containing drinks are somewhat complicated to make and require a fair amount of time, which the host may not have.

Some liquor stores offer bottled eggnog complete with liquor, the liquor preventing non-alcoholic ingredients in the eggnog from spoiling. The emulsion stability of eggnog emulsions is accomplished by the presence of the eggs, and is due in part to the high viscosity of the emulsions.

There are also on the market packaged, alcohol-containing drinks made using non-dairy creamers. Non-dairy creamers are engineered food products, a typical such creamer containing a vegetable fat, a sweetening agent such as corn syrup solids, a protein such as sodium casinate, an emulsifier such as a mono- diglyceride, and a gum stabilizer, all in predetermined proportions. All of the ingredients are relatively pure in composition and their properties are well known, alone and in the combination. It is thus possible to predict the proportions necessary and use of whatever additional ingredients are necessary to make an alcohol-containing such creamer shelf stable.

There is also on the market a product known as Bailey's Irish Cream, prepared from heavy cream, alcohol, sugar and coffee flavor. Aside from the above ingredients, the composition is secret and it is not known how shelf stability of the product is obtained.

U.S. Pat. No. 3,486,906 to Todd, Jr., describes the use of non-ionic emulsifiers such as polyoxyethylene ethers of mixed partial oleic esters of sorbitol anhydrides, including polysorbate 80 and the like, mixed with a flavoring ingredient and added to beer. However, the patent points out that such emulsifiers were found to be not stable in beer and soon produced a highly unpalatable flavor.

U.S. Pat. No. 4,093,750 describes the use of polyglycerol esters in citrus flavored beverages, replacing brominated oils or gum acacia for emulsion stability, and also to provide a cloud to give the drinks a desirable appearance. There is no reference in this patent to the use of these agents in alcohol-containing beverages.

BRIEF DESCRIPTION OF THE PRESENT INVENTION

The present invention resides in a homogenized cream/alcohol-containing beverage comprising cream or milk and alcohol in drink preparation amounts, and a high HLB emulsifier selected from the group consisting of high HLB polyglycerol esters of fatty acids, ethoxylated fatty acid esters; and sugar esters, each in an emulsifying amount.

The cream (or milk) and alcohol are present in major amounts, as distinguished from beverages containing flavor compositions, e.g., essential oils, where a small amount of alcohol carrier may be employed for such compositions.

Natural cream and milk emulsions are very complicated. There are no pure systems in the compositions. Even tap water, which may be used in making the emulsion, contains certain salts which will affect emulsion stability. The proteins which are present, other salts, sugars, flavors and colors, and the emulsion pH, all will have an effect on the emulsion stability. Further, concentrations will vary from batch to batch because of the use of natural cream or milk. These complications are further compounded by the presence of the alcohol which is known to break or have an adverse effect on fat/water emulsions. Thus, it was a surprising and fortuitous discovery to find a limited group of emulsifiers capable of stabilizing such alcohol/cream or milk beverages for prolonged periods of time.

By alcohol, it is meant ethyl alcohol, the traditional alcohol employed in alcoholic beverages. A typical beverage within the scope of the present invention is one that is 34 proof, is homogenized and contains about 17% alcohol, about 14% fat (from heavy cream), plus flavorings and colorants in addition to an emulsifying amount of an emulsifier selected from the group stated above.

A particularly preferred emulsifier is octaglycerol monostearate marketed by SCM Corporation under the trademark "Santone 8-1-S". It was found that this emulsifier, of the many investigated, was by far the best in stabilizing, for many months, a cream-based, alcohol-containing beverage, the cream being 40% butterfat heavy cream, against detectable phase separation. Even shaking, after months of storage, was not necessary prior to consumption.

DETAILED DESCRIPTION OF THE INVENTION

Whereas a large number of emulsifiers are available on the market today and are approved for food uses, only a limited number of emulsifiers are operable in the present invention. There is no particular pattern as to which emulsifiers are operable and which are not, except that those that are operable have high HLB values (more than about 10), preferably about 10 to about 16.

The class of ethoxylated fatty acid esters useful in the present invention are the ethoxylated fatty acid esters of glycerol, hexitol, hexitan and isohexide, as well as the fatty acid esters of ethoxylated glycerol, hexitol, hexitan and isohexide. Sorbitol is a typical hexitol.

One specific class of such compounds for use in the beverage of the present invention are the ethoxylated mono- diglycerides, which are the polyethoxylated fatty acid esters of glycerol, and may be conventionally described as a mixture of stearate, palmitate, and lesser amounts of myristate partial esters of glycerin condensed with about 18 to 22 moles, preferably about 20 moles, of ethylene oxide per mole of alpha-monoglyceride reaction mixture such as set forth in The Food Codex and FDA Regulations, 21 CFR 121.1221, and more particularly as set forth in the Egan patent, U.S. Pat. No. 3,433,645, incorporated herein by reference. The fatty acid radicals of ethoxylated monoglycerides broadly are higher fatty acid chains having about 12 to 18 carbon atoms.

One suitable ethoxylated mono- diglyceride that may be employed in the present invention is Durfax-EOM (trademark) marketed by Durkee Foods Division of SCM Corporation. This emulsifier is manufactured from hydrogenated vegetable oils and has an HLB value of about 13, is fluid at ambient temperature, has an acid value maximum of 2.0, a hydroxyl value of 60–80, a saponification value of 65–75 and an oxyethylene content of 60.5–65.0%.

Other ethoxylated fatty acid esters which may be employed in the present invention are the polysorbates, such as polyoxyethylene (20) sorbitan monostearate (polysorbate 60) or polyoxyethylene (20) sorbitan monooleate (polysorbate 80). These emulsifiers are sold under the trademarks "Durfax 60" and "Durfax 80", respectively, by Durkee Foods Division of SCM Corporation. They have an HLB value of about 13–16 and are fluid at ambient temperature.

Ethoxylated mono- diglycerides may be prepared by reacting ethylene oxide with a mono- diglyceride mixture at temperatures of about 125° C., such as suggested in the Egan patent, U.S. Pat. No. 3,490,918, and incorporated herein by reference. Similar known procedures are available for the preparation of the polysorbates.

Preferred compounds for use in the formulations of the present invention are the high HLB polyglycerol esters having HLB values ranging from 10 to 16. These esters are generally a mixture of monounsaturated and saturated fatty acid esters of a mixture of polyglycerols in which the range of polyglycerol is from octaglycerol to decaglycerol, with one or two fatty acyl ester groups per molecule. The monounsaturated and saturated fatty acids contain 16 to 18 carbon atoms and are typically derived from corn oil, cottonseed oil, lard, palm oil, peanut oil, safflower oil, sesame oil, soybean oil, tallow, and tall oil and the fatty acids derived from these substances may be either hydrogenated or unhydrogenated. The polyglycerol mixture is prepared by the polymerization of glycerol with an alkaline catalyst as exemplified in U.S. Pat. No. 3,637,774, or an acid catalyst as exemplified in U.S. Pat. No. 3,968,169. Polyglycerol esters are obtained by then esterifying the polyglycerol by reaction with fatty acids in direct esterification or by reaction with fats and oils in an interesterification process. Suitable polyglycerol esters broadly have a hydroxyl value of about 400 to 600, a saponification number of about 60 to 100, and acid values of less than about 10. The range of possible polyglycerol esters is small and can range from a monoesterified octaglycerol to a diesterified decaglycerol, with the iodine value of the fatty acid ranging from 0 to 90.

A particularly suitable polyglycerol ester of fatty acids useful in the process of the present invention is octaglycerol monostearate (8-1-S). This compound has a calculated HLB value of about 13 and is of solid or plastic consistency at ambient temperature, having a Mettler Dropping Point of about 52°–57° C. Octaglycerol monostearate typically contains about 60–68% stearic acid and has a hydroxyl number of 500–570, a saponification number of 77–88, an acid number of under 5, and an IV of about 65–85.

Another suitable polyglycerol ester of fatty acids useful in the process of the present invention is octaglycerol monooleate (8-1-O). This compound has a calculated HLB value of about 13–16 and is of fluid consistency at ambient temperature. Octaglycerol monooleate typically contains about 60–68% oleic acid and has a hydroxyl number of 500–570, a saponification number of 68–85 and an acid number of under 4.1. Still another suitable polyglycerol ester is decaglycerol distearate.

The sugar esters and processes for making them are disclosed in a number of prior patents including the Sugar Research Foundation, Inc. patents to Hass, U.S. Pat. Nos. 2,893,990 and 2,970,142; the State of Nebraska patents to Osipow et al., U.S. Pat. Nos. 3,480,616 and 3,644,333; and Dai-Ichikogyo Seiyaku Co., Ltd. U.S. Pat. No. 3,792,041. One particularly suitable sugar ester is OW-1570 (trademark) manufactured by Ryoto Company of Japan. This emulsifier can be characterized as sucrose monooleate with 70% monoester. It has a fatty acid composition of approximately 60% oleic acid, and is fluid with a 60% water content. Its HLB value is about 15.

Because of the presence of the alcohol, an emulsifying amount or usage level of emulsifier required is relatively high, on the order of about 0.14% to about 0.7% by weight, based on the entire weight of the alcohol/fat/water emulsion (or about 1.4 grams per liter to about 7 grams per liter, on a weight/volume basis). At upper usage levels, the ethoxylated mono- diglycerides and polysorbates (which both have detectable flavors) are likely to adversely affect the beverage flavor, making the polyglycerol esters preferred emulsifiers. Also, the polysorbates and ethoxylated mono- and diglycerides are unsaturated compounds, tending to make them subject to spoilage. The polyglycerol ester compound 8-1-S is substantially fully saturated, making this compound very stable in the presence of oxygen. The sugar esters are presently not food approved in the United States.

In cream-containing beverages (40% butterfat in the dairy phase), the octaglycerol monostearate, being solid in consistency, offers the best results and, again, is preferred.

Broadly, the beverage formulations of the present invention will be made with milk or cream and then will be kept refrigerated until consumption, to prevent spoiling, although the presence of the alcohol and sugar may make this unnecessary, particularly where the amount of alcohol employed is relatively high. Milk and cream are traditional ingredients in milk or cream-containing alcoholic beverages, and the purpose of the present invention, in part, is to duplicate such beverages. In beverages containing relatively low amounts of alcohol and/or sugar, particularly at lower levels of sugar and alcohol, refrigeration may be necessary.

The present invention is particularly useful with heavy cream-containing beverages which are 34 proof (having about 17% alcohol). With the emulsifiers of the present invention, particularly octaglycerol monostearate (8-1-S), the beverages are extremely stable against phase separation and also are stable against spoilage. Typically, the heavy cream will be present at a level of about 30-40%. Heavy cream is about 40% butterfat, giving the composition of this embodiment of the present invention a fat content of about 12-16%.

In the beverages of the present invention, the sugar content can vary substantially, depending upon taste. Typically, it will be about 20-30% basis of the entire weight of the emulsion.

The beverages of the present invention can contain many other ingredients than those mentioned above, for instance flavoring (both natural and synthetic), colorants, gum stabilizers, other polysaccharides such as starch, other carbohydrates such as corn syrup solids, and egg or egg-derived products. In all cases, the balance of the formulation, after establishing levels of the above functional ingredients, is water.

As the carbohydrate, there can be used corn syrups with D. E. values of 24 to 70 or higher, molasses, maltose, ribose, galactose, xylose, arabinose, honey, lactose, sucrose, dextrin, water soluble starch, pregelatinized starch, gum arabic, larch gum arabinogalactan, d-glucose, modified starches of the type set forth in Schoch U.S. Pat. No. 2,876,160, e.g., hypochlorite-oxidized cornstarch, torrefaction or roasted dextrins, etherified starches including hydroxyethyl, hydroxypropyl, methyl and ethyl derivatives, starch esters, e.g., starch acetate and starch sulfonate, waxy maize starch, waxy sorghum starch, and converted starches having a D. E. value of 4 to 20.

Colloidal carbohydrate stabilizers include cellulose ethers such as methyl cellulose, e.g., the product marketed under the trademark "Methocel MC" (dimethyl ether of cellulose having 1.64-1.92 methoxy groups per glucose unit), mixed methyl hydropropyl cellulose, e.g., the product marketed under the trademark "methocel 90 HG" (an etherified cellulose having 1.08-1.42 methoxy groups and 0.1-0.3 hydroxypropyl groups per glucose unit) and the product marketed under the trademark "Methocel 65 HG" (an etherified cellulose having 1.61-1.75 methoxy groups and 0.1-0.18 hydroxypropyl groups per glucose unit), carboxymethyl cellulose, low methoxy pectin, i.e., pectin having a methoxy content of 2.5-4.5%, inulin, guar, Irish moss (carragheen), sodium alginate, gum tragacanth, gum karaya and locust bean gum.

The beverages of the present invention are pasteurized in conventional fashion, e.g., at 140°-165° F. for 35 minutes to one hour, usually 155°-160° F., for 35 minutes.

The beverages are then homogenized in conventional fashion to a particle size between 1 to 10 microns. For many uses the particle size of the emulsified material is not over 5 microns; and preferably in preparing the alcohol products of the present invention, particularly heavy cream-containing products, the particle size is reduced to less than about 3 microns, preferably about 1 to 1.5 microns.

Homogenization is carried out in one or two stages at about the pasteurization temperature and at pressures which can vary from 500 psi to 5,000 psi, or somewhat higher. After homogenization, the beverages are cooled and packaged. They remained stable, showing neither spoilage nor phase separation for a prolonged period, even when stored at room temperature.

In the following example and claims, all percentages are on a weight basis, based on the total weight of the beverage unless otherwise specified.

EXAMPLE

The following formula and process yielded a stable emulsion:

| Ingredients | Weight Percent (Approx.) |
| --- | --- |
| Heavy cream (40% fat) | 36 |
| Alcohol | to yield 34 proof |
| Sugar | 24-26% |
| Water | Balance |
| Santone 8-1-S flakes | 2-10 grams/1,000 mls |

The ingredients were added to a mixing boat and mixed and pasteurized at about 155° F., after which they were homogenized in a two-stage homogenizer at pressures of about 3,500 psi and 500 psi to produce a particle size of about 1-1.5 microns.

In this example, the Santone 8-1-S is in flake form, making it easy to use. It is normally very sticky and difficult to use, but by combining it with a carrier such as stearine (in this example, an inert ingredient) in the ratio of about 70% 8-1-S to about 30% stearine, a dry, non-sticky, flake form is obtained. The actual amount of 8-1-S present in the above formula is thus about 1.4 to 7 grams per liter, or on a percentage weight basis, about 0.14 to 0.7 percent. Optimum results were obtained with about 0.6% flakes, or about 0.42% 8-1-S.

What is claimed is:

1. A premixed homogenized cream or milk and alcohol containing beverage comprising:
    alcohol and a cream or milk containing butterfat, milk solids, and water in commercial alcoholic drink preparation amounts wherein the alcohol and cream or milk are emulsified;
    and an emulsifier having an HLB more than about 10 selected from the group consisting of polyglycerol esters of fatty acids, ethoxylated fatty acid esters and sugar esters, said emulsifier being present in the amount of about 0.14-0.7% by weight based on the entire weight of the alcohol/fat/water emulsion, effective to achieve emulsion stability, thus preventing phase separation.

2. The beverage of claim 1 wherein said emulsifier is octaglycerol monostearate.

3. The beverage of claims 1 or 2 wherein said cream or milk is heavy cream.

4. The beverage of claims 1 or 2 wherein said cream or milk is heavy cream in an amount of about 30-40%, and comprising ethyl alcohol to about 34 proof.

5. The beverage of claim 4 containing about 20-30% sugar.

6. The beverage of claim 4 homogenized to a particle size of about 1-1.5 microns.

* * * * *